(12) United States Patent
Chen et al.

(10) Patent No.: US 9,661,443 B2
(45) Date of Patent: May 23, 2017

(54) METHOD, APPARATUS, AND COMPUTER PROGRAM PRODUCT FOR DATA DISTRIBUTION IN WIRELESS NETWORKS

(75) Inventors: Canfeng Chen, Beijing (CN); Jia Liu, Beijing (CN); Yongguang Guo, Beijing (CN)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 14/385,814

(22) PCT Filed: Apr. 5, 2012

(86) PCT No.: PCT/CN2012/073527
§ 371 (c)(1),
(2), (4) Date: Jun. 19, 2015

(87) PCT Pub. No.: WO2013/149380
PCT Pub. Date: Oct. 10, 2013

(65) Prior Publication Data
US 2015/0289081 A1  Oct. 8, 2015

(51) Int. Cl.
*H04B 7/00* (2006.01)
*H04W 4/00* (2009.01)
(Continued)

(52) U.S. Cl.
CPC ......... *H04W 4/008* (2013.01); *H04L 12/1845* (2013.01); *H04L 67/06* (2013.01);
(Continued)

(58) Field of Classification Search
CPC ... H04W 4/008; H04W 76/023; H04W 72/04; H04L 67/104
(Continued)

(56) References Cited

U.S. PATENT DOCUMENTS 8,874,034 B2 * 10/2014 Walley et al. ............... 455/41.2
2002/0194607 A1  12/2002 Connelly
(Continued)

FOREIGN PATENT DOCUMENTS

CN     101627403     1/2010
CN     102223366    10/2011
(Continued)

OTHER PUBLICATIONS

International Search Report for International Application No. PCT/CN2012/073527, Date of Completion of Search: Jan. 1, 2013, 2 pages.
(Continued)

*Primary Examiner* — Eugene Yun
(74) *Attorney, Agent, or Firm* — Locke Lord LLP

(57) ABSTRACT

Method, apparatus, and computer program product example embodiments enable wireless communication devices to advertise wireless communication connections in an improved manner. In example embodiments, a method is disclosed for creating, at an apparatus, operating parameters for a wireless data channel connection and descriptive information regarding content available on the wireless data channel connection; transmitting, by the apparatus, one or more non-connectable undirected wireless advertising channel messages indicating presence of the wireless data channel connection, the operating parameters associated with the wireless data channel connection, and the descriptive information regarding the content available on the wireless data channel connection; and transmitting, by the apparatus, information on the wireless data channel connection according to the operating parameters, including the content.

22 Claims, 12 Drawing Sheets

(51) Int. Cl.
H04W 8/00 (2009.01)
H04L 29/08 (2006.01)
H04L 12/18 (2006.01)
H04W 72/04 (2009.01)
H04W 76/02 (2009.01)
H04W 84/18 (2009.01)

(52) U.S. Cl.
CPC ......... *H04L 67/1095* (2013.01); *H04W 8/005* (2013.01); *H04W 72/04* (2013.01); *H04W 76/023* (2013.01); *H04W 84/18* (2013.01)

(58) Field of Classification Search
USPC ....................................... 455/41.2
See application file for complete search history.

(56) References Cited

U.S. PATENT DOCUMENTS

| | | | | |
|---|---|---|---|---|
| 2010/0120362 A1* | 5/2010 | Walley | .................. | H04W 16/14 455/41.2 |
| 2011/0013549 A1 | 1/2011 | Urie | | |
| 2011/0070820 A1 | 3/2011 | Gao et al. | | |
| 2011/0107367 A1 | 5/2011 | Georgis et al. | | |
| 2012/0196534 A1* | 8/2012 | Kasslin | ............... | H04W 76/002 455/41.2 |

FOREIGN PATENT DOCUMENTS

| | | |
|---|---|---|
| CN | 102289281 | 12/2011 |
| CN | 102378365 A | 3/2012 |
| WO | WO2008062979 | 5/2008 |

OTHER PUBLICATIONS

Extended European Search Report for EP App. No. 12873663.4—Dated Oct. 6, 2015, 8 pages.

English Language Machine Translation of Chinese Patent Application Publication No. CN102378365A, Published: Mar. 14, 2012, 31 pages.

* cited by examiner

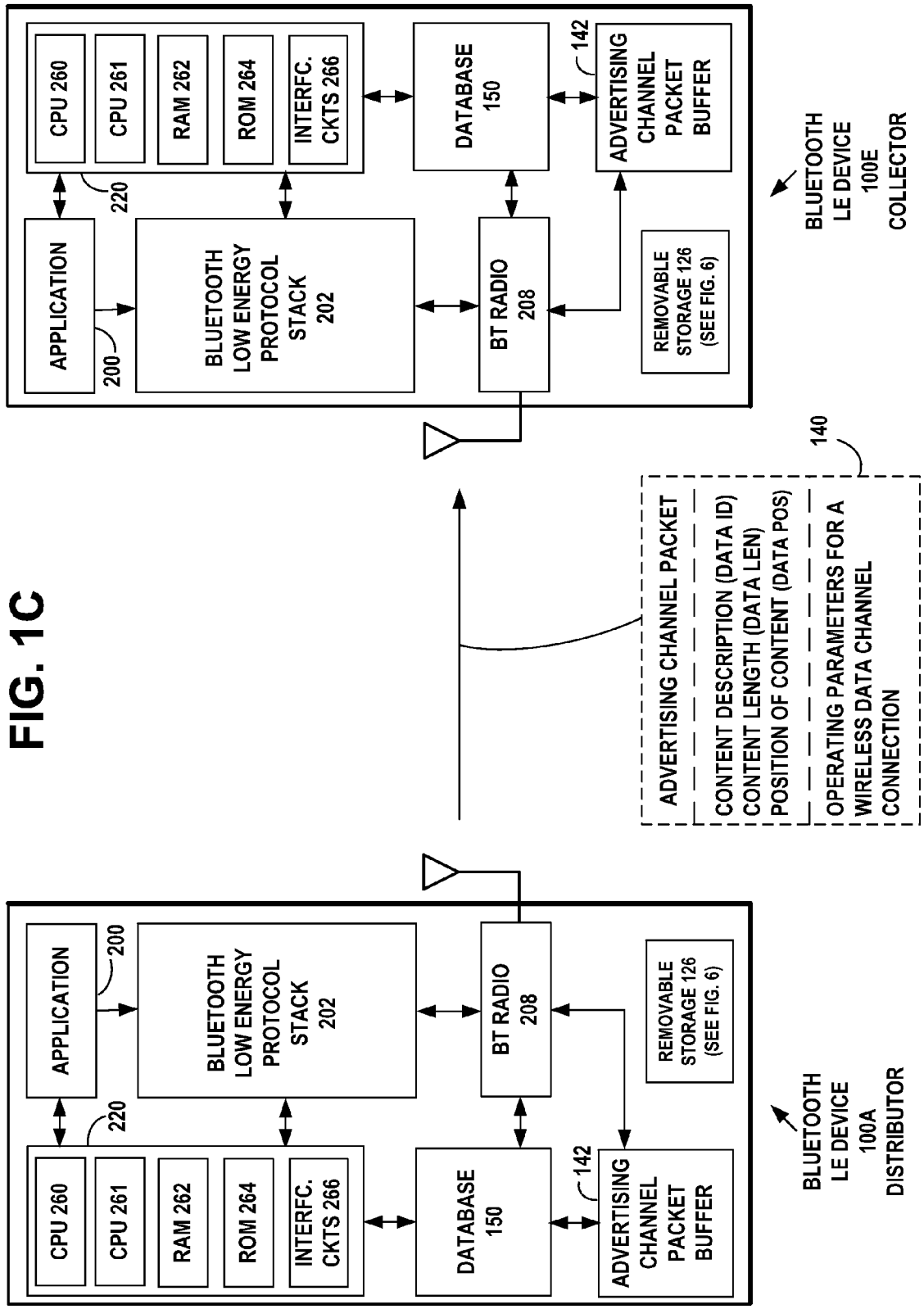

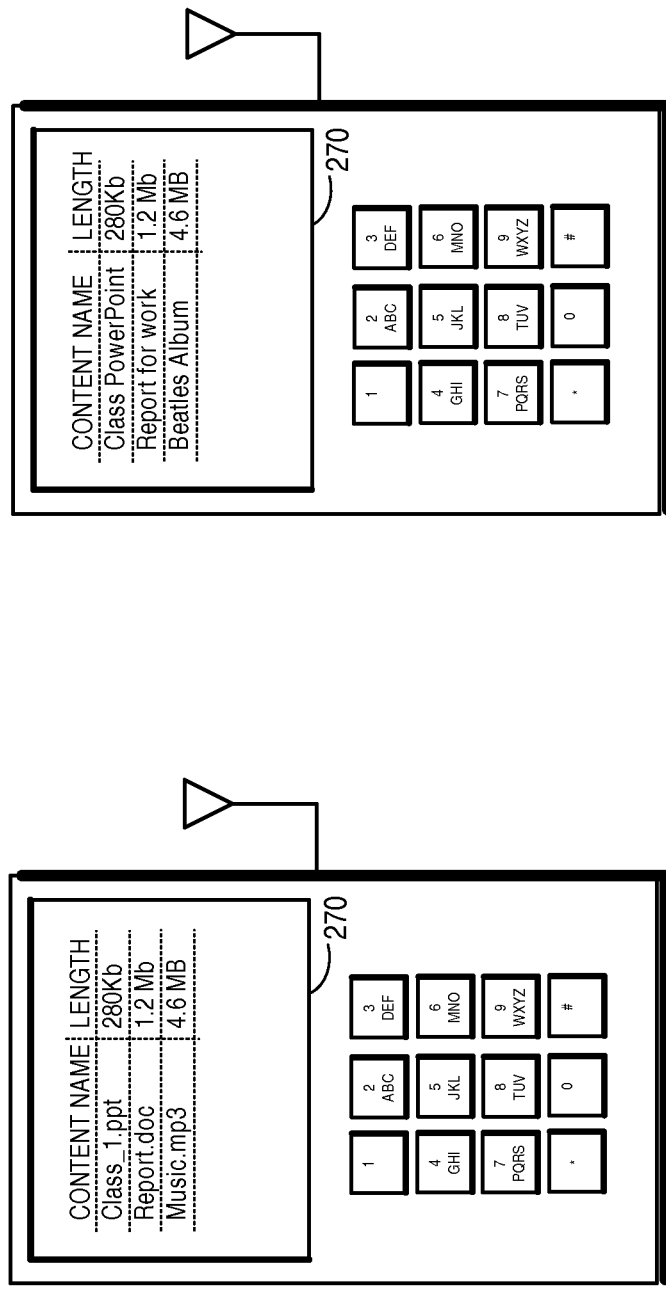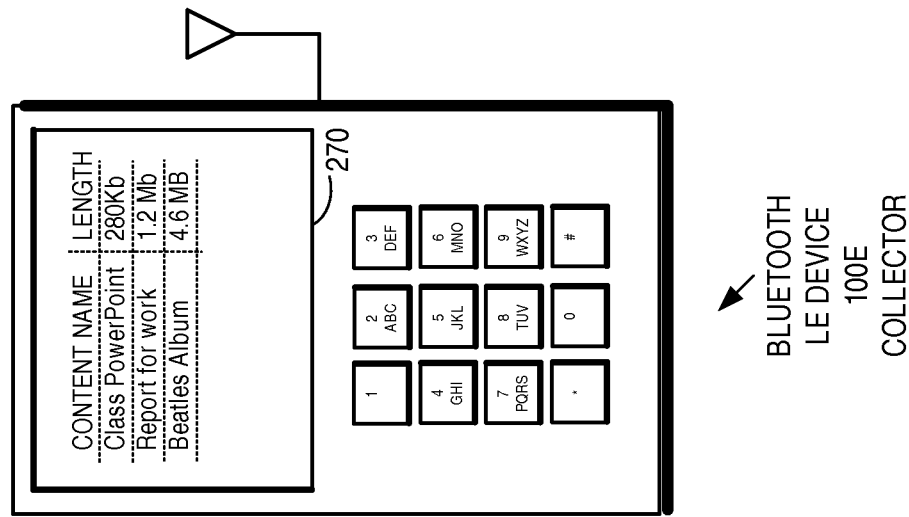

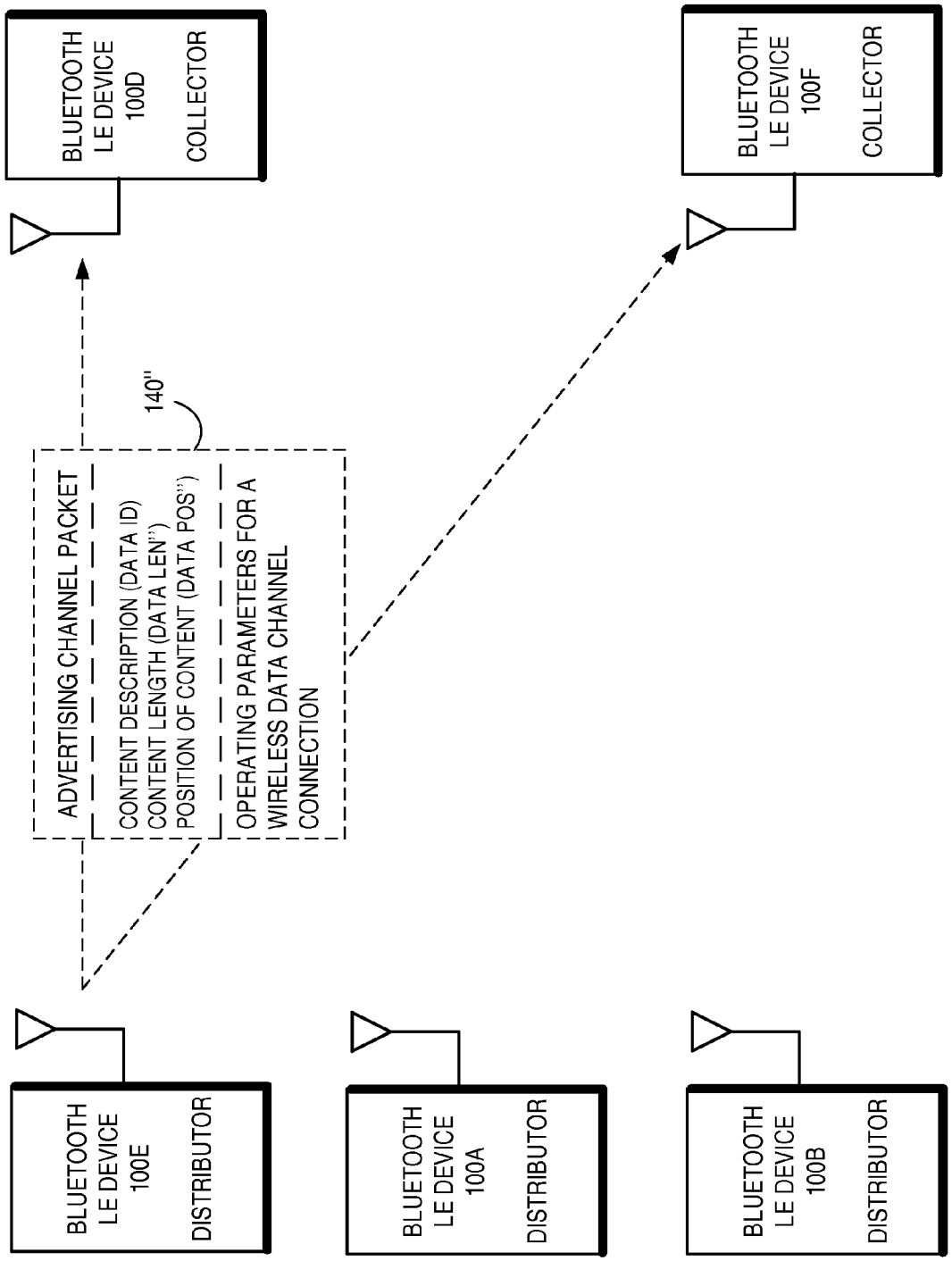

STEP 352: CREATING, AT AN APPARATUS, OPERATING PARAMETERS FOR A WIRELESS DATA CHANNEL CONNECTION AND DESCRIPTIVE INFORMATION REGARDING CONTENT AVAILABLE ON THE WIRELESS DATA CHANNEL CONNECTION;

↓

STEP 354: TRANSMITTING, BY THE APPARATUS, ONE OR MORE NON-CONNECTABLE UNDIRECTED WIRELESS ADVERTISING CHANNEL MESSAGES INDICATING PRESENCE OF THE WIRELESS DATA CHANNEL CONNECTION, THE OPERATING PARAMETERS ASSOCIATED WITH THE WIRELESS DATA CHANNEL CONNECTION, AND THE DESCRIPTIVE INFORMATION REGARDING THE CONTENT AVAILABLE ON THE WIRELESS DATA CHANNEL CONNECTION; AND

↓

STEP 356: TRANSMITTING, BY THE APPARATUS, INFORMATION ON THE WIRELESS DATA CHANNEL CONNECTION ACCORDING TO THE OPERATING PARAMETERS, INCLUDING THE CONTENT.

STEP 452: RECEIVING, BY AN APPARATUS, ONE OR MORE NON-CONNECTABLE UNDIRECTED WIRELESS ADVERTISING CHANNEL MESSAGES THAT INCLUDE DESCRIPTIVE INFORMATION REGARDING CONTENT AVAILABLE ON ONE OR MORE WIRELESS DATA CHANNEL CONNECTIONS;

↓

STEP 454: COMPILING A LIST OF ONE OR MORE DISTRIBUTOR DEVICES ADVERTISING CONTENT AVAILABLE ON THE ONE OR MORE WIRELESS DATA CHANNEL CONNECTIONS, BASED ON THE RECEIVED WIRELESS ADVERTISING CHANNEL MESSAGES, THE LIST INCLUDING THE DESCRIPTION OF THE CONTENT AVAILABLE; AND

↓

STEP 456: SELECTING FROM THE LIST, ONE OF THE ONE OR MORE DISTRIBUTOR DEVICES, BASED ON THE DESCRIPTION IN THE WIRELESS ADVERTISING CHANNEL MESSAGES, OF THE CONTENT AVAILABLE.

METHOD, APPARATUS, AND COMPUTER PROGRAM PRODUCT FOR DATA DISTRIBUTION IN WIRELESS NETWORKS

FIELD

The field of the invention relates to wireless communication and more particularly to data distribution in wireless communication connections.

BACKGROUND

Perhaps the best-known example of wireless personal area network (PAN) technology is Bluetooth Standard, which operates in the 2.4 GHz ISM band. Bluetooth is a short-range radio network, originally intended as a cable replacement. Bluetooth Technical Specifications are published by the Bluetooth SIG, Inc. *Bluetooth Specification version 2.0+EDR*, published Oct. 15 2004 has the original functional characteristics of the first version Bluetooth Basic Rate (BR) and adds the Enhanced Data Rate (EDR) feature. *Bluetooth Specification version 2.1+EDR*, published Jul. 26 2007 for Basic Rate/Enhanced Data Rate (BR/EDR), added definitions for new features: Encryption Pause Resume, Erroneous Data reporting, Extended Inquiry Response, Link Supervision Timeout Event, Packet Boundary Flag, Secure Simple Pairing, Sniff Subrating. *Bluetooth Specification version 3.0+HS*, published Apr. 21 2009, updated the standard to integrate the Alternate MAC/PHY and Unicast Connection-less Data features.

On Apr. 20, 2009, Bluetooth SIG presented the new Bluetooth Low Energy protocol. Bluetooth Low Energy (LE) is a communication protocol directed to optimize power consumption of devices while being connected to other devices. The Bluetooth Low Energy packets include a preamble used for radio synchronization, an access address used for physical link identification, a shorter protocol data unit (PDU) to carry the payload data and the PDU header information, and a cyclic redundancy code (CRC) to ensure correctness of the data in the PDU.

On Jun. 30, 2010, the Bluetooth SIG published the *Bluetooth Core Specification, Version 4.0* (incorporated herein by reference), which includes the Bluetooth Low Energy (LE) protocol for products that require lower power consumption, lower complexity, and lower cost than would be possible using the BR/EDR protocol. Bluetooth LE is designed for applications requiring lower data rates and shorter duty cycles, with a very-low power idle mode, a simple device discovery, and short data packets. Bluetooth LE devices employ a star topology, where one device serves as a master for a plurality of slave devices, the master dictating connection timing by establishing the start time of the first connection event and the slave devices transmitting packets only to the master upon receiving a packet from the master. According to Bluetooth LE communication protocol all connections are point-to-point connections between two devices (the master and the slave).

SUMMARY

Method, apparatus, and computer program product example embodiments enable wireless communication devices to advertise wireless communication connections in an improved manner.

According to an example embodiment of the invention, a method comprises:

creating, at an apparatus, operating parameters for a wireless data channel connection and descriptive information regarding content available on the wireless data channel connection;

transmitting, by the apparatus, one or more non-connectable undirected wireless advertising channel messages indicating presence of the wireless data channel connection, the operating parameters associated with the wireless data channel connection, and the descriptive information regarding the content available on the wireless data channel connection; and transmitting, by the apparatus, information on the wireless data channel connection according to the operating parameters, including the content.

According to an example embodiment of the invention, a method comprises:

wherein the wireless advertising channel message includes an indication of what portion of a full complement of the content the apparatus has available for downloading.

According to an example embodiment of the invention, a method comprises:

receiving the content available, from one or more distributor devices on one or more wireless data channel connections.

According to an example embodiment of the invention, a method comprises:

wherein the wireless advertising channel message is transmitted on a Bluetooth Low Energy advertising channel and the wireless data channel message is transmitted on a Bluetooth Low Energy data channel.

According to an example embodiment of the invention, a method comprises:

wherein the operating parameters included in the wireless advertising channel messages enable a receiving device to receive the information transmitted on the wireless data channel connection.

According to an example embodiment of the invention, a method comprises:

receiving, by an apparatus, one or more non-connectable undirected wireless advertising channel messages that include descriptive information regarding content available on one or more wireless data channel connections;

compiling a list of one or more distributor devices advertising content available on the one or more wireless data channel connections, based on the received wireless advertising channel messages, the list including the description of the content available; and selecting from the list, one of the one or more distributor devices, based on the description in the wireless advertising channel messages, of the content available.

According to an example embodiment of the invention, a method comprises:

wherein the selecting is based on a portion of the content being indicated as available as indicated in the wireless advertising channel messages and whether less than all of the content has been previously accumulated by the apparatus.

According to an example embodiment of the invention, a method comprises:

receiving one or more copies of the content from the one or more wireless data channel connections;

filtering the one or more copies of the received content based on the description of the available content in the wireless advertising channel messages; and presenting only one copy of the content.

According to an example embodiment of the invention, a method comprises:

computing an auto-relaying probability that the apparatus may become a distributor device to further advertise and distribute the content, based on receiving one or more non-connectable undirected wireless advertising channel messages from one or more other distributor devices.

According to an example embodiment of the invention, a method comprises:

wherein the wireless advertising channel message is received on a Bluetooth Low Energy advertising channel and the wireless data channel is a Bluetooth Low Energy data channel.

According to an example embodiment of the invention, an apparatus comprises:

at least one processor;

at least one memory including computer program code;

the at least one memory and the computer program code configured to, with the at least one processor, cause the apparatus at least to:

create operating parameters for a wireless data channel connection and descriptive information regarding content available on the wireless data channel connection;

transmit one or more non-connectable undirected wireless advertising channel messages indicating presence of the wireless data channel connection, the operating parameters associated with the wireless data channel connection, and the descriptive information regarding the content available on the wireless data channel connection; and transmit information on the wireless data channel connection according to the operating parameters, including the content.

According to an example embodiment of the invention, an apparatus comprises:

wherein the wireless advertising channel message includes an indication of what portion of a full complement of the content the apparatus has available for downloading.

According to an example embodiment of the invention, an apparatus comprises:

the at least one memory and the computer program code configured to, with the at least one processor, cause the apparatus at least to:

receive the content available, from one or more distributor devices on one or more wireless data channel connections.

According to an example embodiment of the invention, an apparatus comprises:

wherein the wireless advertising channel message is transmitted on a Bluetooth Low Energy advertising channel and the wireless data channel message is transmitted on a Bluetooth Low Energy data channel.

According to an example embodiment of the invention, an apparatus comprises:

wherein the operating parameters included in the wireless advertising channel messages enable a receiving device to receive the information transmitted on the wireless data channel connection.

According to an example embodiment of the invention, an apparatus comprises:

at least one processor;

at least one memory including computer program code;

the at least one memory and the computer program code configured to, with the at least one processor, cause the apparatus at least to:

receive one or more non-connectable undirected wireless advertising channel messages that include descriptive information regarding content available on one or more wireless data channel connections;

compile a list of one or more distributor devices advertising content available on the one or more wireless data channel connections, based on the received wireless advertising channel messages, the list including the description of the content available; and select from the list, one of the one or more distributor devices, based on the description in the wireless advertising channel messages, of the content available.

According to an example embodiment of the invention, an apparatus comprises:

wherein the selecting is based on a portion of the content being indicated as available as indicated in the wireless advertising channel messages and whether less than all of the content has been previously accumulated by the apparatus.

According to an example embodiment of the invention, an apparatus comprises:

the at least one memory and the computer program code configured to, with the at least one processor, cause the apparatus at least to:

receive one or more copies of the content from the one or more wireless data channel connections;

filter the one or more copies of the received content based on the description of the available content in the wireless advertising channel messages; and present only one copy of the content.

According to an example embodiment of the invention, an apparatus comprises:

the at least one memory and the computer program code configured to, with the at least one processor, cause the apparatus at least to:

compute an auto-relaying probability that the apparatus may become a distributor device to further advertise and distribute the content, based on receiving one or more non-connectable undirected wireless advertising channel messages from one or more other distributor devices.

According to an example embodiment of the invention, an apparatus comprises:

wherein the wireless advertising channel message is received on a Bluetooth Low Energy advertising channel and the wireless data channel is a Bluetooth Low Energy data channel.

According to an example embodiment of the invention, a computer program product comprises computer executable program code recorded on a computer readable non-transitory storage medium, the computer executable program code comprising:

code for creating, at an apparatus, operating parameters for a wireless data channel connection and descriptive information regarding content available on the wireless data channel connection;

code for transmitting, by the apparatus, one or more non-connectable undirected wireless advertising channel messages indicating presence of the wireless data channel connection, the operating parameters associated with the wireless data channel connection, and the descriptive information regarding the content available on the wireless data channel connection; and code for transmitting, by the apparatus, information on the wireless data channel connection according to the operating parameters, including the content.

22. According to an example embodiment of the invention, a computer program product comprises computer executable program code recorded on a computer readable non-transitory storage medium, the computer executable program code comprising:

code for receiving, by an apparatus, one or more non-connectable undirected wireless advertising channel messages that include descriptive information regarding content available on one or more wireless data channel connections;

code for compiling a list of one or more distributor devices advertising content available on the one or more wireless data channel connections, based on the received wireless advertising channel messages, the list including the description of the content available; and code for selecting from the list, one of the one or more distributor devices, based on the description in the wireless advertising channel messages, of the content available.

Accordingly, wireless communication devices are capable of advertising wireless communication connections in an improved manner.

DESCRIPTION OF THE FIGURES

FIG. 1C is an example embodiment of the internal architecture of the first Bluetooth LE distributor device and the second Bluetooth LE collector device, where the first distributor device transmits the advertising channel packet ADV_MULTICAST_IND, that carries to the second collector device information about the content available from the first distributor device, to perform content-centric data distribution, in accordance with an example embodiment of the invention.

FIG. 1D is an example embodiment of the external appearance of the second Bluetooth LE collector device presenting a list of the content advertised by the first and second distributor devices, displayed in the form of the file handle names of the content available for downloading, enabling the user to directly choose which distributor devices may be of interest for downloading the advertised content, in accordance with an example embodiment of the invention.

FIG. 1E is an example embodiment of the external appearance of the second Bluetooth LE collector device presenting a list of the content advertised by the first and second distributor devices, displayed in the form of character string descriptions of the content available for downloading, enabling the user to directly choose which distributor devices may be of interest for downloading the advertised content, in accordance with an example embodiment of the invention.

FIG. 1F is an example embodiment of the wireless network of FIG. 1A, that has been modified by second Bluetooth LE collector device becoming a distributor device, wherein the second collector device has completed receiving the content, and has automatically become a distributor device, to advertise information in the advertising channels describing the received content, while relaying the content in the data channels, just as its original first and second distributor devices did, in accordance with an example embodiment of the invention.

FIG. 3B is an example embodiment of a flow diagram of a method, from the point of view of distributor device, in accordance with an example embodiment of the invention.

FIG. 4B is an example embodiment of a flow diagram of a method, from the point of view of the collector device, in accordance with an example embodiment of the invention.

DISCUSSION OF EXAMPLE EMBODIMENTS OF THE INVENTION

Figure 1A:
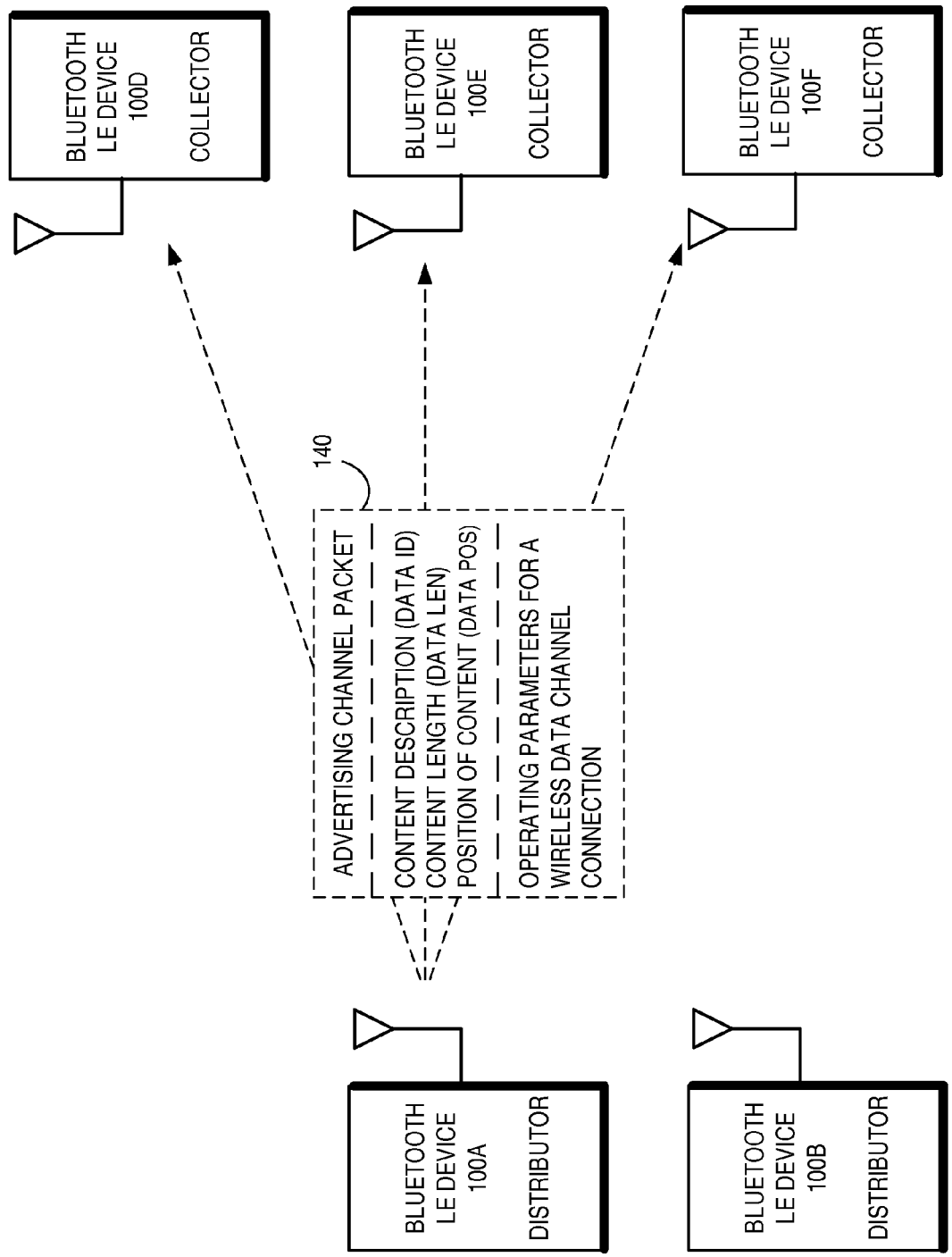
FIG. 1A is an example embodiment of a wireless network using the Bluetooth LE protocol, including first and second Bluetooth LE distributor devices and first, second, and third Bluetooth LE collector devices, where the first distributor device transmits a new advertising channel packet or protocol data unit (PDU) named ADV_MULTICAST_IND, that carries to the collector devices information about the content available from the first distributor device, to perform content-centric data distribution, in accordance with an example embodiment of the invention.

This section is organized into the following topics:

I. Data Distribution In Wireless Short-Range Communication Networks

II. Bluetooth™ Low Energy (LE) Technology

III. Content-Centric Data Distribution In Wireless Networks

I. Data Distribution in Wireless Short-Range Communication Networks

Short-range communication technologies provide communication solutions appropriate for many data applications, without the cost, traffic and legislative concerns of longer-range communication technologies. Popular short-range communication technologies include Bluetooth basic rate/enhanced data rate (BR/EDR), Bluetooth Low Energy (LE), IEEE 802.11 wireless local area network (WLAN), Wireless Universal Serial Bus (WUSB), Ultra Wide-band (UWB), ZigBee (IEEE 802.15.4, IEEE 802.15.4a), and near field communication technologies, such as radio frequency identification (RFID) and near field communication (NFC) technology that enable contactless identification and interconnection of wireless devices. Bluetooth Low Energy (LE) Technology provides an example of data distribution in wireless short-range communication networks.

II. Bluetooth Low Energy (LE) Technology

The Bluetooth™ Core Specification, Version 4.0 includes the Bluetooth LE protocol for products that require lower power consumption, lower complexity, and lower cost than would be possible using the BR/EDR protocol. Bluetooth LE is designed for applications requiring lower data rates and shorter duty cycles, with a very-low power idle mode, a simple device discovery, and short data packets. Bluetooth LE devices may employ a star topology, where one device serves as a master for a plurality of slave devices, the master dictating connection timing by establishing the start time of the first connection event and the slave devices transmitting packets only to the master upon receiving a packet from the master. According to Bluetooth LE communication protocol all connections are point-to-point connections between two devices (the master and the slave).

The Bluetooth LE protocol allows a star network topology in connections, where one device serves as a master for a plurality of slave devices. The master device dictates the connection timing and communication operations of the one or more slave devices. Bluetooth LE communicates over a total of 40 RF channels, each having a bandwidth of 2 MHz. Data communication between Bluetooth LE devices occurs in 37 pre-specified data channels, of the 40 RF channels. All data connection transmissions occur in connection events wherein a point-to-point connection is established between the master device and a slave device. In the Bluetooth LE protocol, a slave device provides data through Bluetooth LE communication to the master device to which it is connected. The remaining 3 channels, of the 40 RF channels, are advertising channels used by devices to advertise their existence and capabilities. The Bluetooth LE protocol defines a unidirectional connectionless broadcast mode on the advertising channels.

The Link Layer provides a state machine with the following five states: Standby State, Advertising State, Scanning State, Initiating State, and Connection State. The Link Layer state machine allows only one state to be active at a time. The Link Layer in the Standby State does not transmit or receive any packets and can be entered from any other state. The Link Layer in the Advertising State will be transmitting advertising channel packets and possibly listening to and responding to responses triggered by these advertising channel packets. A device in the Advertising State is known as an advertiser. The Advertising State can be entered from the Standby State. The Link Layer in the Scanning State will be listening for advertising channel packets from devices that are advertising. A device in the Scanning State is known as a scanner. The Scanning State can be entered from the Standby State. The Link Layer in the Initiating State will be listening for advertising channel packets from a specific device and responding to these packets to initiate a connection with that specific device. A device in the Initiating State is known as an initiator. The Initiating State can be entered from the Standby State. The Connection State of the Link Layer may be entered either from the Initiating State or the Advertising State. A device in the Connection State is known as being in a connection over a data channel. Within the Connection State, two roles are defined: the Master Role and the Slave Role. When a device in the Initiating State, enters the Connection State, it is in the Master Role, it exchanges data packets with a slave device in a data channel, and it defines the timings of transmissions. When a device in the Advertising State, enters the Connection State, it is in the Slave Role and exchanges data packets with a master device in a data channel, wherein the master device defines the timings of transmissions.

The Bluetooth LE radio operates in the unlicensed 2.4 GHz ISM band, in the same manner as does the Basic Rate/Enhanced Data Rate (BR/EDR) radio. Bluetooth LE supports very short data packets, from 8 octets to a maximum of 27 octets, giving it a low duty cycle. Bluetooth LE employs a frequency hopping transceiver with many frequency hopping spread spectrum (FHSS) carriers, with a bit rate of 1 Megabit per second (Mb/s).

Bluetooth LE employs two multiple access schemes: Frequency division multiple access (FDMA) and time division multiple access (TDMA). Forty (40) physical channels, separated by 2 MHz, are used in the FDMA scheme. Three (3) are used as advertising channels and 37 are used as data channels. A TDMA based polling scheme is used in which one device transmits a packet at a predetermined time and a corresponding device responds with a packet after a predetermined interval.

The physical channel is sub-divided into time units known as events. Data is transmitted between Bluetooth LE devices in packets that are positioned in these events. There are two types of events: Advertising and Connection events.

Devices that transmit advertising packets on the advertising Physical Layer (PHY) channels are referred to as advertisers. Devices that receive advertising on the advertising channels without the intention to connect to the advertising device are referred to as scanners. Devices that form a connection to another device by listening for connectable advertising packets, are referred to as initiators. Transmissions on the advertising PHY channels occur in advertising events.

In the Bluetooth™ Core Specification, Version 4.0, there are four advertising event types: connectable undirected advertising (ADV_IND), connectable directed advertising (ADV_DIRECT_IND), scannable undirected advertising (ADV_SCAN_IND), and non-connectable undirected advertising (ADV_NONCONN_IND). At the start of each advertising event, the advertiser sends an advertising packet corresponding to the advertising event type. The header of the advertising channel packet identifies the packet type in a four-bit PDU Type field encoding. There are seven values currently assigned to the four-bit PDU Type field, ranging from 0000 to 0110, with the values 0111 to 1111 being reserved for future use.

The scanner device, also referred to as the initiator device, that receives the advertising packet, may make a connect request (CONNECT_REQ) to the advertiser device on the same advertising PHY channel. The CONNECT_REQ request includes fields for access address AA, CRC, WinSize, WinOffset, Interval, Latency, Timeout, ChannelMap, Hop count, and sleep clock accuracy SCA. The four-bit PDU Type field in the header of the CONNECT_REQ advertising channel packet, is 0101. When the advertiser device accepts the CONNECT_REQ request, a point-to-point connection results between the scanner/initiator device that becomes the master device, and the advertiser device that becomes the slave device in a piconet. The master and the slave devices know at what time and in which frequency the connection is in operation. The data channel changes between every connection event and the start of connection events are spaced regularly with the connection interval that is provided in the CONNECT_REQ packet.

In the connectable undirected advertising (ADV_IND) channel packet, the ADV_IND PDU has a payload field containing AdvA and AdvData fields. The AdvA field contains the advertiser's public or random device address and the AdvData field may contain Advertising data from the advertiser's host. The PDU may be used in connectable undirected advertising events. The four-bit PDU Type field in the header of the ADV_IND advertising channel packet, is 0000.

In the connectable directed advertising (ADV_DIRECT_IND) channel packet, the ADV_DIRECT_IND PDU has the payload field containing AdvA and InitA fields. The AdvA field contains the advertiser's public or random device address. The InitA field is the address of the device to which this PDU is addressed. The InitA field may contain the initiator's public or random device address. The PDU may be used in connectable directed advertising events. This packet may not contain any host data. The four-bit PDU Type field in the header of the ADV_DIRECT_IND advertising channel packet, is 0001.

In a non-connectable undirected event type advertising channel packet, ADV_NONCONN_IND, a scanner device is allowed to receive information in the advertising channel packet, but scanner devices are not allowed to transmit anything in the advertising channels upon receiving the ADV_NONCONN_IND advertising channel packets. When the non-connectable undirected event type is used, non-connectable advertising indications ADV_NONCONN_IND packets are sent by the Link Layer. The non-connectable undirected event type allows a scanner to receive information contained in the ADV_NONCONN_IND from the advertiser. The advertiser may either move to the next used advertising channel index or close the advertising event after each ADV_NONCONN_IND that is sent. The four-bit PDU Type field in the header of the ADV_NONCONN_IND advertising channel packet, is 0010.

In the scannable undirected advertising (ADV_SCAN_IND) channel packet, the ADV_SCAN_IND PDU has the payload field containing AdvA and AdvData fields. The AdvA field contains the advertiser's public or random device address. The PDU may be used in scannable undirected advertising events. The AdvData field may contain Advertising Data from the advertiser's host. The four-bit PDU Type field in the header of the ADV_SCAN_IND advertising channel packet, is 0110.

In the Bluetooth™ Core Specification, Version 4.0, if the advertiser is using a connectable advertising event, a scanner/initiator may make a connection request using the same advertising PHY channel on which it received the connectable advertising packet. The advertising event is ended and connection events begin if the advertiser receives and accepts the request for a connection to be initiated. Once a connection is established, the scanner/initiator becomes the master device in a piconet and the advertising device becomes the slave device. Within a connection event, the master and slave alternate sending data packets using the same data PHY channel.

Example non-limited use cases for Bluetooth LE technology include sports and fitness, security and proximity and smart energy. Bluetooth LE technology is designed for devices to have a battery life of up to one year such as those powered by coin-cell batteries. These types of devices include watches that will utilize Bluetooth LE technology to display Caller ID information and sports sensors that will be utilized to monitor the wearer's heart rate during exercise. The Medical Devices Working Group of the Bluetooth SIG is also creating a medical devices profile and associated protocols to enable Bluetooth applications for Bluetooth LE devices.

III. Content-Centric Data Distribution in Wireless Networks

In an example embodiment of the invention, Bluetooth LE devices that dispatch their data publicly are referred to herein as distributors and Bluetooth LE devices that receive that dispatched data are referred to herein as collectors. In an example embodiment of the invention, distributors employ content-centric data distribution using a new advertising channel packet or protocol data unit (PDU), named ADV_MULTICAST_IND, that carries information about the content available from the distributor. Rather than being presented with a device list of distributors IDs or addresses, users of the collector devices may be presented with a list of the content advertised by the distributor devices, enabling the user to directly choose which distributor devices may be of interest for downloading the advertised content. A new four-bit PDU Type field taken from the currently available reserved values, for example 0111, may be used in the header to identify the ADV_MULTICAST_IND advertising channel packet.

In example embodiments of the invention, a new probabilistic auto-relaying algorithm enables those collector devices that have accumulated the advertised content, to be candidates for becoming distributor devices, themselves, to further advertise and distribute the content. The new probabilistic auto-relaying algorithm enables choosing which one or more of several possible candidate collector devices may become a distributor device, thereby minimizing redundancy in replicating the advertised content to be distributed in the network.

In an example embodiment of the invention, a Bluetooth LE distributor device with at least a portion of a full complement of the content, may advertise that content using the ADV_MULTICAST_IND advertising channel packet in the advertising channels. While advertising the content on an advertising channel, the Bluetooth LE distributor device may also transmit the advertised content on one or more data channels.

The information in the ADV_MULTICAST_IND advertising channel packet describing the content, may include a file handle name or a character string description of the content, represented by the Data ID parameter. In the case of a content description that is longer than the space available in a single ADV_MULTICAST_IND advertising packet, example techniques to communicate the longer description may include data compression, pointers to a directory or description database, or sequential delivery of portions of the description by sequential advertising packets, similar to the sequential delivery of text in a short message service (SMS). The information in the ADV_MULTICAST_IND advertising channel packet describing the content, may also include the length of the content in the packet, represented by the Data Len parameter.

In an example embodiment of the invention, a Bluetooth LE collector device may scan the advertising channels. If the Bluetooth LE collector device receives an ADV_MULTICAST_IND advertising channel packet, it performs a filtering process in its Link Layer (LL), based on the information describing the content in the ADV_MULTICAST_IND advertising channel packet. The filter process enables the presentation of only one copy of the content to the upper application layers in the collector device and presentation to the user, rather than multiple copies of identical content that the collector device may have received.

In an example embodiment of the invention, the collector device compiles a list of the distributor devices that are advertising various content descriptions. Then, once a content is chosen by the user, the collector device's Link Layer may select a proper distributor from the compiled list of those distributor devices that are currently advertising the content. The selection of a proper distributor takes into consideration whether a portion, but not all, of the content has been previously accumulated by the collector device. The ADV_MULTICAST_IND advertising channel packet received by the collector device includes a parameter, Data Pos, that represents the portion of the content that the distributor has available for downloading. Some distributors may posses less than the full complement of the content. If the distributor device has advertised that it has a portion of the content that happens to be missing in the collector device's accumulated content, the distributor device will be considered by the collector device as a proper distributor to be selected for downloading the content. In order to receive the advertised content, the collector device's Link Layer will then join the data channel of the selected distributor device.

In an example embodiment of the invention, any collector device that has completed receiving the content, may automatically become a candidate distributor, to advertise information in the advertising channels describing the received content, while relaying the content in the data channels, just as its original distributor did.

FIG. 1A is an example embodiment of a wireless network using the Bluetooth LE protocol, including first and second Bluetooth LE distributor devices 100A and 100B and first, second, and third Bluetooth LE collector devices 100D, 100E, and 100F, respectively. The first distributor device 100A transmits a new advertising channel packet 140 or protocol data unit (PDU) named ADV_MULTICAST_IND on a Bluetooth LE advertising channel, that carries to the collector devices 100D, 100E, and 100F, information about the content available from the first distributor device 100A on one or more Bluetooth LE data channels, to perform content-centric data distribution, in accordance with an example embodiment of the invention. Various types of content that may be available for downloading on the data channels include documents, drawings, photographs, video files, music files, and the like.

In an example embodiment of the invention, distributor device 100A employs content-centric data distribution using the ADV_MULTICAST_IND advertising channel packet 140 that carries information about the content available from the distributor 100A. Rather than being presented with a device list of distributors IDs or addresses, users of the collector devices 100D, 100E, and 100F may be presented with a list of the content advertised by the distributor device 100A, enabling the user to directly choose which distributor devices may be of interest for downloading the advertised content.

In an example embodiment of the invention, the information in the ADV_MULTICAST_IND advertising channel packet 140 describing the content, may include a file handle name or a character string description of the content, represented by the Data ID parameter. The information in the ADV_MULTICAST_IND advertising channel packet 140 describing the content, may also include the length of the content in the packet, represented by the Data Len parameter. The ADV_MULTICAST_IND advertising channel packet 140 includes a parameter, Data Pos, that represents the portion of the content that the distributor device 100A has available for downloading. Some distributors may posses less than the full complement of the content. The ADV_MULTICAST_IND advertising channel packet 140 also includes operating parameters for a wireless data channel connection, including the ChIndex field that represents the identity of the data channel being advertised.

In an example embodiment of the invention, each collector device 100D, 100E, and 100F may scan the advertising channels. If the Bluetooth LE collector device 100E receives an ADV_MULTICAST_IND advertising channel packet 140, it performs a filtering process in its Link Layer (LL), based on the information describing the content in the ADV_MULTICAST_IND advertising channel packet 140. The filter process enables the presentation of only one copy of the content to the upper application layers in the collector device 100E and presentation to the user, rather than multiple copies of identical content that the collector device 100E may have received.

Figure 1B:
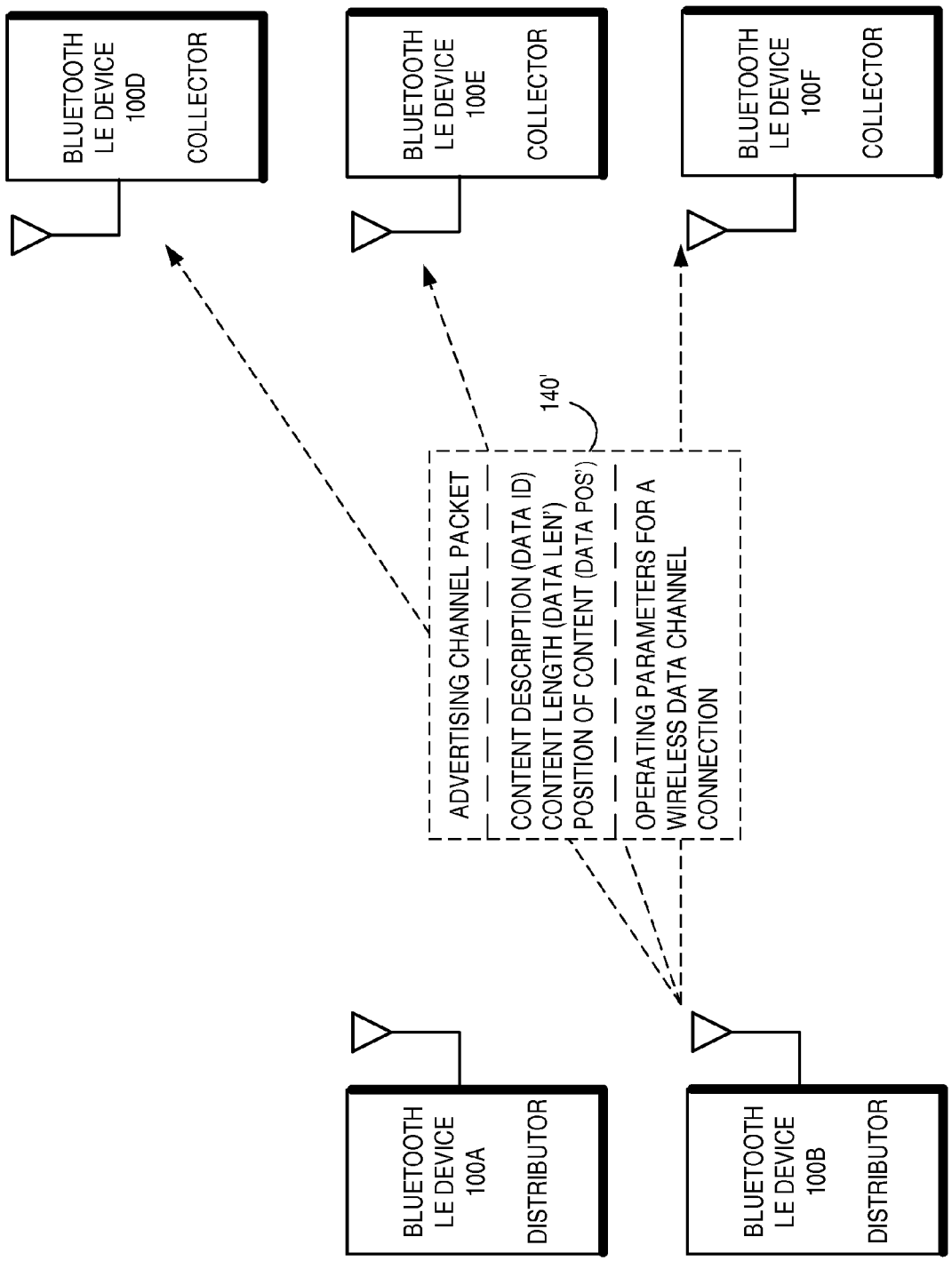
FIG. 1B is an example embodiment of the wireless network of FIG. 1A, wherein the second distributor device transmits the advertising channel packet ADV_MULTICAST_IND, that carries to the collector devices information about the content available from the second distributor device, to perform content-centric data distribution, in accordance with an example embodiment of the invention.

FIG. 1B is an example embodiment of the wireless network of FIG. 1A, wherein the second distributor device 100B transmits the ADV_MULTICAST_IND advertising channel packet 140', that carries to the collector devices 100D, 100E, and 100F, information about the content available from the second distributor device 100B, to perform content-centric data distribution, in accordance with an example embodiment of the invention.

In an example embodiment of the invention, the collector device 100E compiles a list of the distributor devices 100A and 100B that are advertising various content descriptions. Then, once a content is chosen by the user, the collector device's Link Layer may select a proper distributor 100A from the compiled list of those distributor devices 100A and 100B that are currently advertising the content. The selection of a proper distributor device 100A takes into consideration whether a portion, but not all, of the content has been previously accumulated by the collector device 100E. The ADV_MULTICAST_IND advertising channel packets 140 and 140' received by the collector device 100E include the parameter, Data Pos, that represents the portion of the content that each respective distributor device 100A and 100B has available for downloading. Some distributors may posses less than the full complement of the content. If the distributor device 100A has advertised that it has a portion of the content that happens to be missing in the collector device's 100E accumulated content, the distributor device 100A will be considered by the collector device 100E as a proper distributor to be selected for downloading the content.

In order to receive the advertised content, the collector device 100E's Link Layer will then join the data channel of the selected distributor device 100A.

FIG. 1C is an example embodiment of the internal architecture of the first Bluetooth LE distributor device 100A and the second Bluetooth LE collector device 100E, where the first distributor device 100A transmits the ADV_MULTICAST_IND advertising channel packet 140, that carries to the second collector device 100E information about the content available from the first distributor device 100A, to perform content-centric data distribution, in accordance with an example embodiment of the invention.

The first Bluetooth LE distributor device 100A and the second Bluetooth LE collector device 100E may be a Bluetooth enabled communications device, PDA, cell phone, laptop or palmtop computer, or the like or it may be a stationary access point, automotive dashboard interface, home electronics interface or other Bluetooth enabled stationary interface or device. The first Bluetooth LE distributor device and the second Bluetooth LE collector device may be a Bluetooth enabled remote controller, healthcare monitor, sports sensor, token, key fob, watch, wireless keyboard, gaming pad, body sensor, toy, health care equipment, human interface device, entertainment device, wireless microphone, GPS sensor, or the like. The first Bluetooth LE distributor device and the second Bluetooth LE collector device may include a processor 220, which includes a dual core central processing unit (CPU) 260 and 261, a random access memory (RAM) 262, a read only memory (ROM) 264, and interface circuits 266 to interface with the radio transceiver 208. The first Bluetooth LE distributor device and the second Bluetooth LE collector device may each further include a battery and other power sources, key pad, touch screen, display, microphone, speakers, ear pieces, camera or other imaging devices, etc. The RAM 262 and ROM 264 may be removable memory devices such as smart cards, SIMs, WIMs, semiconductor memories such as RAM, ROM, PROMS, flash memory devices, etc. according to an embodiment of the present invention. According to an embodiment, the first Bluetooth LE distributor device and the second Bluetooth LE collector device each include the Bluetooth Low Energy protocol stack 202, which is described in the *Bluetooth Core Specification, Version 4.0* protocol specification. In an example embodiment of the invention, the first Bluetooth LE distributor device and the second Bluetooth LE collector device may also include a Bluetooth BR/EDR protocol stack, which is described in the *Bluetooth Specification version 3.0+HS*.

Figure 6:
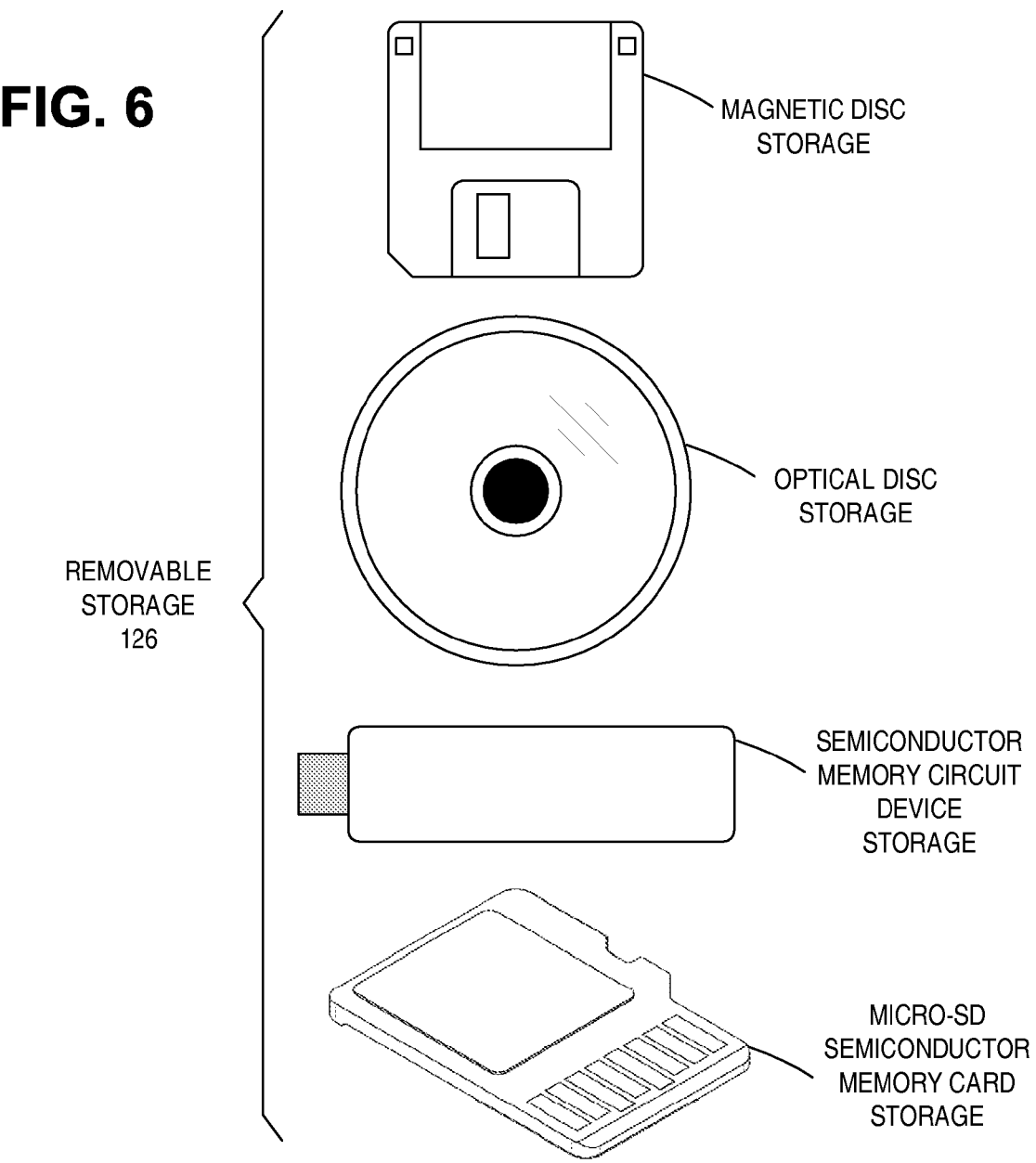
FIG. 6 illustrates an example embodiment of the invention, wherein examples of removable storage media are shown, based on magnetic, electronic and/or optical technologies, such as magnetic disks, optical disks, semiconductor memory circuit devices and micro-SD memory cards (SD refers to the Secure Digital standard) for storing data and/or computer program code as an example computer program product, in accordance with an example embodiment of the invention.

The processor 220, protocol Bluetooth protocol stack 202 and/or application program 200 may be embodied as program logic stored in the RAM 262 and/or ROM 264 in the form of sequences of programmed instructions which, when executed in the CPUs 260 and/or 261, carry out the functions of the disclosed embodiments. The program logic may be delivered to the writeable RAM, PROMS, flash memory devices, etc. 262 of the first Bluetooth LE distributor device and the second Bluetooth LE collector device from a computer program product or article of manufacture in the form of computer-usable media such as resident memory devices, smart cards or other removable memory devices, as illustrated in FIG. 6. Alternately, they may be embodied as integrated circuit logic in the form of programmed logic arrays or custom designed application specific integrated circuits (ASIC). The Bluetooth radio 208 in the each of the first Bluetooth LE distributor device and the second Bluetooth LE collector device may be separate transceiver circuits or alternately, the radio 208 may be a single radio module capable of handling one or multiple channels in a high speed, time and frequency multiplexed manner in response to the processor 220. The program code for instructing the apparatus to perform its various operations may be stored in computer readable media, for example magnetic disks, CD ROMS, or flash memory devices. The program code may be downloaded from such computer readable media to be stored for example in the RAM 262 or programmable ROM 264 of the first Bluetooth LE distributor device and the second Bluetooth LE collector device for execution of the program code for example by the CPUs 260 and/or 261.

In accordance with an example embodiment of the invention, the processor 220 in the distributor device 100A creates operating parameters for a wireless data channel connection and a description of content available for distribution on the wireless data channel connection and assembles the ADV_MULTICAST_IND advertising channel packet 140 in the advertising channel packet buffer 142. The distributor device 100A transmits the contents of its advertising channel packet buffer 142 as the ADV_MULTICAST_IND advertising channel packet 140 to the collector devices 100D, 100E, and 100F, that have been in a scanning mode. When the collector device 100E has received the ADV_MULTICAST_IND advertising channel packet 140, it is buffered in its advertising channel packet buffer 142 for processing by its processor 220.

In accordance with an example embodiment of the invention, the processor 220 in the collector device 100E may store the list of the content advertised by the distributor devices 100A and 100B in the database 150, enabling the user to directly choose which distributor devices may be of interest for downloading the advertised content.

In an example embodiment of the invention, the first Bluetooth LE distributor device 100A and the second Bluetooth LE collector device 100E may be any of a variety of wireless personal area, wireless local area, or wireless wide area radio devices, such as Land Mobile Radio, Professional Mobile Radio, DECT (Digital Enhanced Cordless Telecommunications), 1G, 2G, 3G, 4G Cellular systems, IrDA, RFID (Radio Frequency Identification), Wireless USB, DSRC (Dedicated Short Range Communications), Near Field Communication, wireless sensor networks, ZigBee, EnOcean; Bluetooth, TransferJet, Ultra-wideband (UWB from WiMedia Alliance), WLAN, IEEE 802.11, WiFi, HiperLAN, Wireless Metropolitan Area Networks (WMAN) and Broadband Fixed Access (BWA) (LMDS, WiMAX, AIDAAS and HiperMAN), or the like.

FIG. 1D is an example embodiment of the external appearance of the second Bluetooth LE collector device 100E presenting a list of the content advertised by the first and second distributor devices, displayed on the display 270 in the form of the file handle names of the content available for downloading, enabling the user to directly choose which distributor devices may be of interest for downloading the advertised content, in accordance with an example embodiment of the invention. The information in the ADV_MULTICAST_IND advertising channel packet 140 describing the content, may include a file handle name of the content, represented by the Data ID parameter.

FIG. 1E is an example embodiment of the external appearance of the second Bluetooth LE collector device 100E presenting a list of the content advertised by the first and second distributor devices, displayed on the display 270 in the form of descriptions of the content available for downloading, enabling the user to directly choose which distributor devices may be of interest for downloading the advertised content, in accordance with an example embodiment of the invention. The information in the ADV_MULTICAST_IND advertising channel packet 140 describing the content, may include a character string description of the content, represented by the Data ID parameter. In the case of a character string description that is longer than the space available in a single ADV_MULTICAST_IND advertising packet 140, example techniques to communicate the longer description may include data compression, pointers to a directory or description database, or sequential delivery of portions of the description by sequential advertising packets, similar to the sequential delivery of text in a short message service (SMS).

FIG. 1F is an example embodiment of the wireless network of FIG. 1A, that has been modified by second Bluetooth LE collector device 100E that is transformed into functioning as a distributor device. The second collector device 100E has completed receiving the content on the data channels and has automatically transformed into functioning as a distributor device. The second collector device 100E functioning as a distributor device, may transmit an ADV_MULTICAST_IND advertising packet 140" to advertise information in the advertising channels describing the received content, while relaying the content in the data channels, just as did its original first and second distributor devices 100A and 100B, in accordance with an example embodiment of the invention. In an example embodiment of the invention, any collector device 100D, 100E, or 100F that has completed receiving the content, may automatically become a candidate distributor device, to advertise information in the advertising channels describing the received content, while relaying the content in the data channels, just as did its original distributor.

Figure 2:
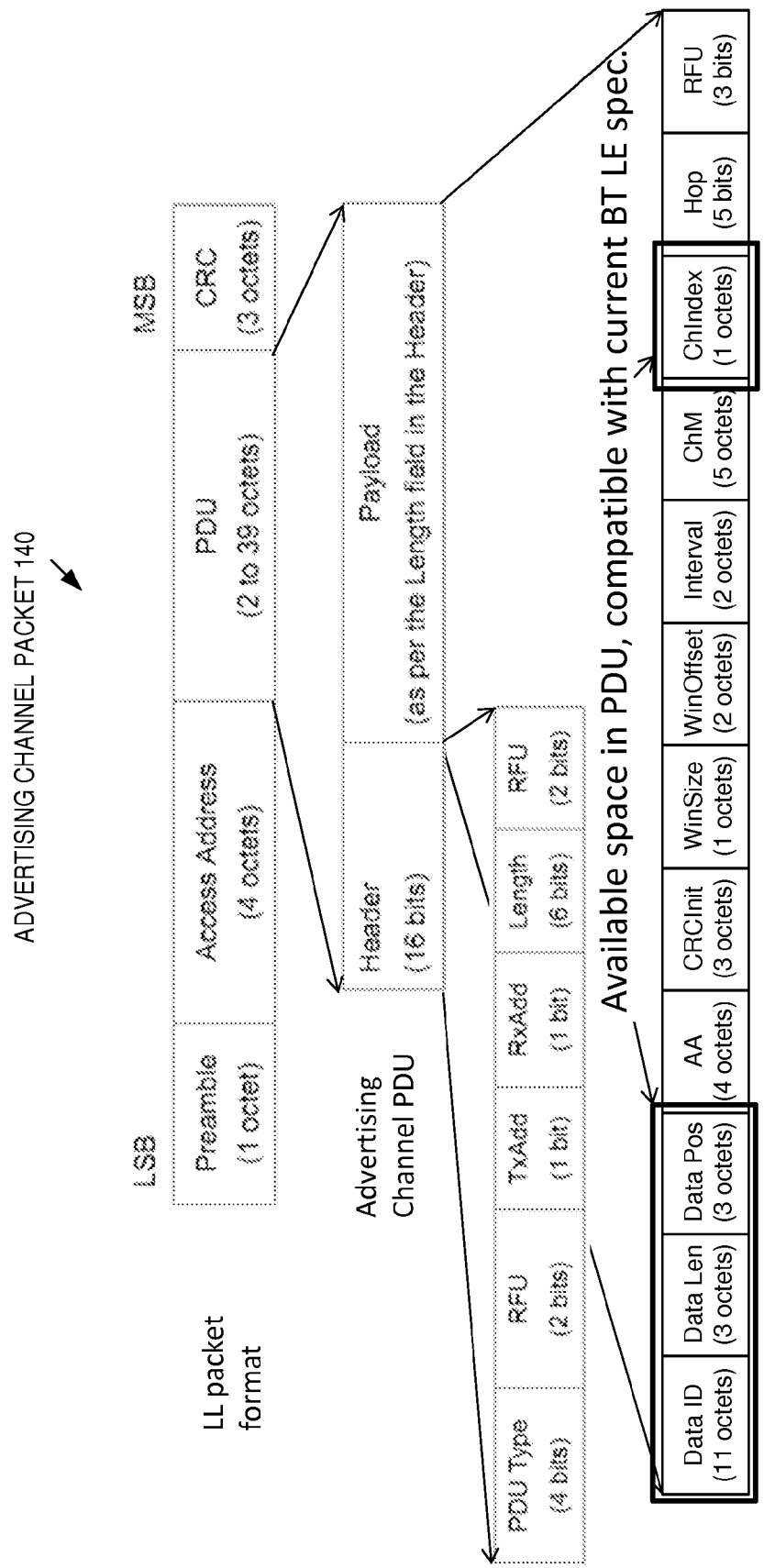
FIG. 2 illustrates an example format of an example advertising channel packet (PDU) ADV_MULTICAST_IND, in accordance with an example embodiment of the invention.

FIG. 2 illustrates an example format of an example ADV_MULTICAST_IND advertising channel packet, in accordance with an example embodiment of the invention. FIG. 2 shows the format for the ADV_MULTICAST_IND advertising packet, where the payload field contains the content description information fields (Data ID, Data Len, and Data Pos). The content description information fields contain a description of the content advertised as being available in a designated data channel. By comparison, the payload field of the CONNECT_REQ advertising channel packet contains Bluetooth address fields of InitA and AdvA. The InitA field contains the initiator's device address, the AdvA field contains the advertiser's device address. This information is not required in the ADV_MULTICAST_IND advertising packet, since the ChIndex field contains the identity of the data channel being advertised. The data channels have channel index values ranging from 0 to 36 and the value of the ChIndex field in the ADV_MULTI- CAST_IND advertising channel packet, is the channel index of the data channel being advertised.

In an example embodiment of the invention, the Data ID field contains the file name of the content in an 8.3 format, designating filenames that have at most eight characters, optionally followed by a period "." and a three character file extension.

In an example embodiment of the invention, the information in the ADV_MULTICAST_IND advertising channel packet describing the content, may include a character string description of the content, represented by the Data ID parameter. In the case of a content description that is longer than the space available in a single ADV_MULTI- CAST_IND advertising packet, example techniques to communicate the longer description may include data compression, pointers to a directory or description database, or sequential delivery of portions of the description by sequential advertising packets, similar to the sequential delivery of text in a short message service (SMS).

The information in the ADV_MULTICAST_IND advertising channel packet describing the content, may also include the length of the content in the packet, represented by the Data Len parameter. The Data Len field indicates the actual length of the intact file in bytes.

It should be pointed out that the design of ADV_MUL- TICAST_IND PDU fully complies with existing Bluetooth Specification V4.0 since a) The PDU Type of ADV_MUL- TICAST_IND uses one of the reserved number values 0111 to 1111 currently reserved for future use; and b) the definition of ADV_MULTICAST_IND PDU uses the available spaces in LL PDU (2 to 39 octets).

The Bluetooth LE link layer has only one packet format used for both advertising channel packets and data channel packets. Each packet consists of four fields: the preamble, the Access Address, the protocol data unit (PDU), and the cyclic redundancy code (CRC). The preamble is 1 octet and the Access Address is 4 octets. The PDU range is from 2 to a maximum of 39 octets. The CRC is 3 octets. The Access Address for all advertising channel packets is hex value 0x8E89BED6.

The preamble and Access Address are followed by a PDU. The advertising channel PDU has a 16-bit header and a variable size payload. The PDU Type field of the advertising channel PDU that is contained in the header, indicates the PDU type. The TxAdd and RxAdd fields of the advertising channel PDU that are contained in the header, contain information specific to the PDU type defined for each advertising channel PDU. The Length field of the advertising channel PDU header indicates the payload field length in octets, and may be 6 to 37 octets.

The Payload fields in the advertising channel PDUs are specific to the PDU Type. The fields of the ADV_MULTI- CAST_IND PDU have the following meanings:

Data ID: Identification of the Data, e.g. the file name in 8.3 format

Data Len: The length of the data (in Bytes); 0 means streaming

Data Pos: The relative position of the data to be sent in the connection event advertised AA: Access Address, contains the connection's access address (like AA in CONNECT_REQ)

CRCInit: Contains the initialization value for the CRC calculation (like CRCInit in CONNECT_REQ)

WinOffset: Indicates start time of the connection event start transmission window (like WinOffset in CONNECT_REQ)

WinSize: Indicates connection event start transmission window size (like WinSize in CONNECT_REQ)

Interval: Contains connInterval parameter value (like Interval in CONNECT_REQ)

ChM: Channel Map, contains the channel map (like ChM in CONNECT_REQ)

ChIndex: Indicates unmapped data channel index for the connection event advertised Hop: Indicates the hopincrement (like Hop in CONNECT_REQ)

RFU: Reserved for future use

The value of ChIndex field is the identity of the data channel being advertised. There are forty RF channels with three advertising channels and 37 data channels. The data channels have channel index values ranging from 0 to 36 and the advertising channels have the index values of 37, 38, and 39. The value of the ChIndex field in the ADV_ MULTICAST_IND advertising channel packet, is the channel index of the data channel being advertised.

Figure 3A:
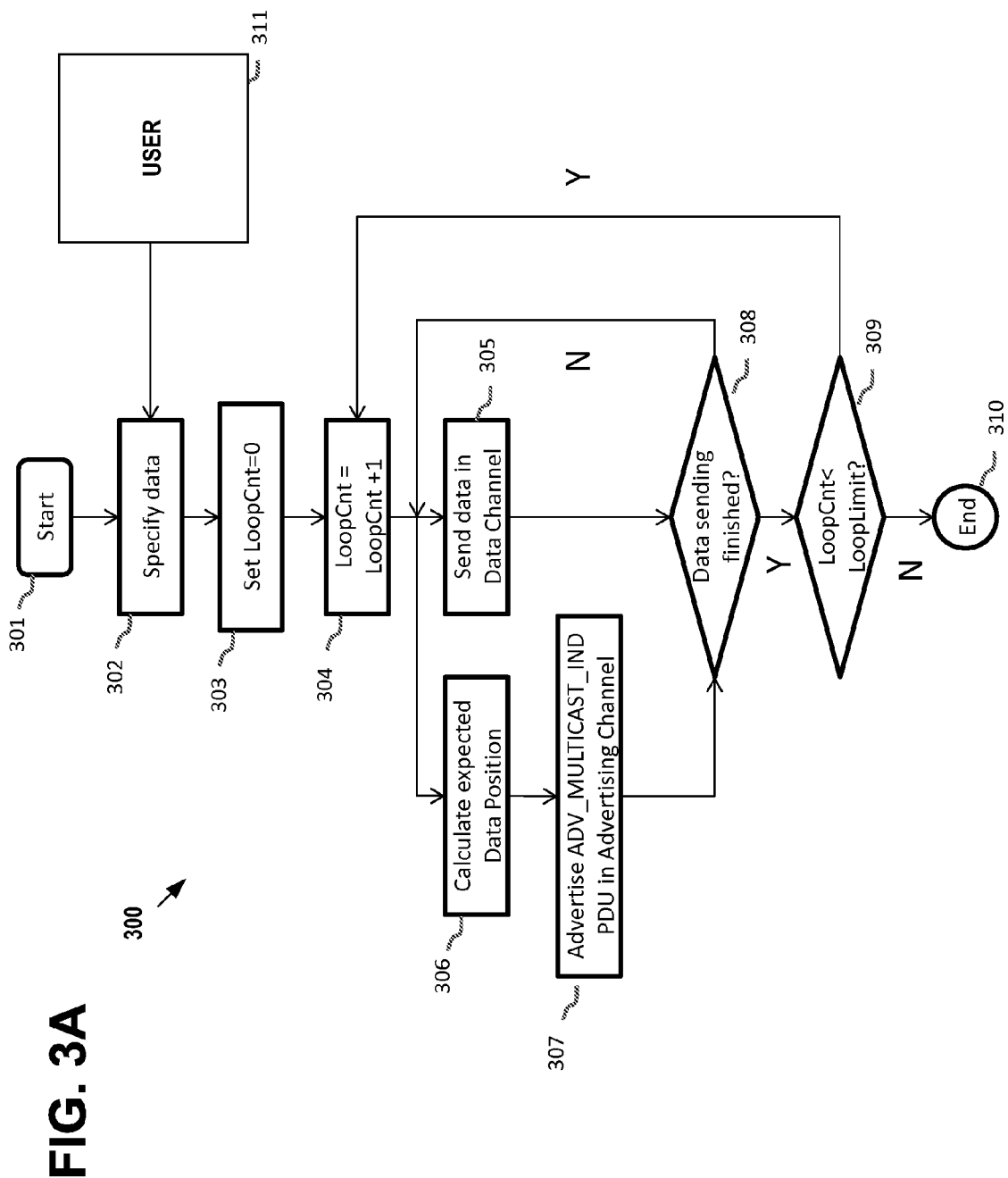
FIG. 3A illustrates an example flowchart of an example operation of a distributor device in data distribution, such as a Bluetooth LE distributor, in accordance with an example embodiment of the invention.

FIG. 3A illustrates an example flowchart of an example operation of a distributor device in data distribution, such as a Bluetooth LE distributor, in accordance with an example embodiment of the invention. After the process starts 301, user 311 can specify the data 302 he/she wants to distribute. For the purpose that more collectors can successfully receive, the distributor device should loop the data sending for several times. A LoopCounter may initially be set to 0 303, and add 1 at the beginning of each cycle of data sending 304. During a cycle of data sending, the distributor on one hand sends data in Data Channels 305, on the other hand, it calculates expected Data Position 306, and forms ADV_ MULTICAST_IND PDU having it send in Advertising Channels 307. The two concurrent operations are kept going until the distributor finds the data sending cycle is finished 308. After that, the LoopCounter is compared with the predefined LoopLimit 309—the loop carries on if the former is less than the latter; otherwise the whole distributing operation process comes to the end 310.

It should be pointed out that, due to the dynamic characteristics of the wireless networks, transmission of BT LE can be influenced by nodes movement, radio interference, or simply by user's operation. Therefore, collectors may not be guaranteed the completion of data reception just from one distributor, and it is possible for a collector to get fragments of different portion of data. The Data Pos herein will be served as an effective basis for distributor selection, so as to quickly complete the whole data transmission. For example, a collector who has received first half portion of a file detects disconnection of its associated distributor; it can then pick up another distributor the Data Pos of who is closest to its missing portion, and make connection to continue the reception.

FIG. 3B is an example embodiment of a flow diagram 350 of a method, from the point of view of distributor device, according to at least one embodiment. The steps of the flow diagram represent computer code instructions stored in the RAM and/or ROM memory, which when executed by the central processing units (CPU) CPU1 and/or CPU2, carry out the functions of the example embodiments of the invention. The steps may be carried out in another order than shown and individual steps may be combined or separated into component steps. The flow diagram has the following steps:

Step 352: creating, at an apparatus, operating parameters for a wireless data channel connection and descriptive information regarding content available on the wireless data channel connection;

Step 354: transmitting, by the apparatus, one or more non-connectable undirected wireless advertising channel messages indicating presence of the wireless data channel connection, the operating parameters associated with the wireless data channel connection, and the descriptive information regarding the content available on the wireless data channel connection; and Step 356: transmitting, by the apparatus, information on the wireless data channel connection according to the operating parameters, including the content.

Figure 4A:
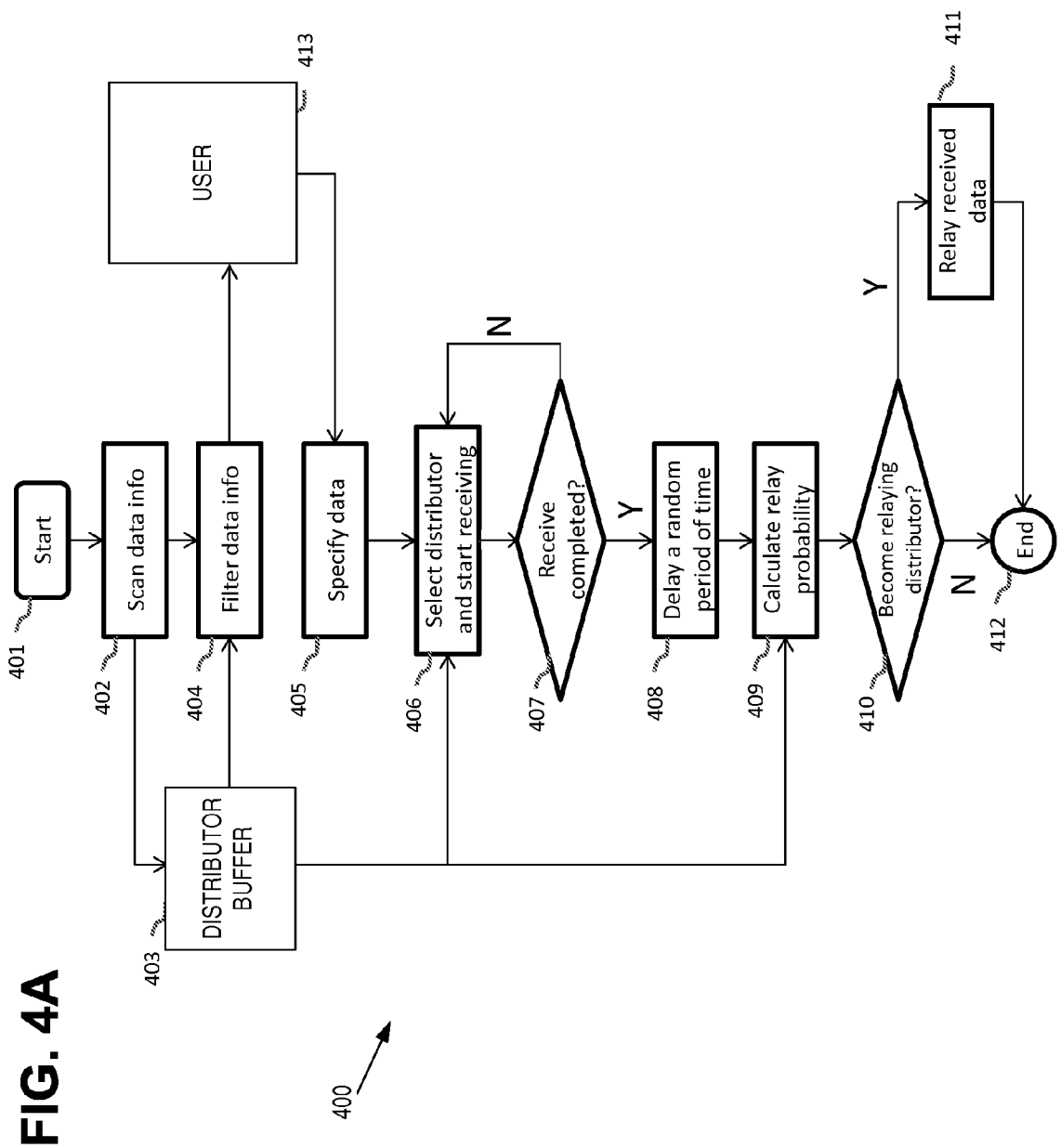
FIG. 4A illustrates an example flowchart of an example operation of a collector device in data distribution, such as a Bluetooth LE collector device, in accordance with an example embodiment of the invention.

FIG. 4A illustrates an example flowchart of an example operation of a collector device in data distribution, such as a Bluetooth LE collector device, in accordance with an example embodiment of the invention. After the process starts 401, the collector device will first scan ADV_DATA_MULTICAST_PDU to collect data information 402, and then keep it in a Distributor Buffer 403. The data information in ADV_DATA_MULTICAST_PDU can be exploited in discriminating different data for the purpose of data filtering 404. Data from different distributors yet with exactly the same names and lengths will be considered as the identical copies and filtered by the LL of Bluetooth LE device. After the user 413 specifies the data 405 he/she is interested, the data information and connection information of ADV_DATA_MULTICAST_PDU stored in the Distributor Buffer 403 are used for selecting the proper distributor 406. An exemplary implementation is that, since the Data Pos field contains the relative position of the data to be sent in the connection event advertised, collectors can examine the missing parts of their data, and select the distributor which will sends the wanted parts in the nearest future. The distributor selection and data receiving will keep going until all the parts of the data are received completely 407.

After the data reception, the collector enters into a relaying decision process by:

First, delay a random period of time 408.
Second, calculate relay probability 409.
Last, using the calculated probability to determine if it should become a relaying distributor 410.

If the answer is Yes, it begins relay received data automatically 411 by entering the process of data distributing 301; otherwise it ends the whole data collecting process 412.

FIG. 4B is an example embodiment of a flow diagram 450 of a method, from the point of view of the collector device, according to at least one embodiment. The steps of the flow diagram represent computer code instructions stored in the RAM and/or ROM memory, which when executed by the central processing units (CPU) CPU1 and/or CPU2, carry out the functions of the example embodiments of the invention. The steps may be carried out in another order than shown and individual steps may be combined or separated into component steps. The flow diagram has the following steps:

Step 452: receiving, by an apparatus, one or more non-connectable undirected wireless advertising channel messages that include descriptive information regarding content available on one or more wireless data channel connections;

Step 454: compiling a list of one or more distributor devices advertising content available on the one or more wireless data channel connections, based on the received wireless advertising channel messages, the list including the description of the content available; and Step 456: selecting from the list, one of the one or more distributor devices, based on the description in the wireless advertising channel messages, of the content available.

Figure 5:
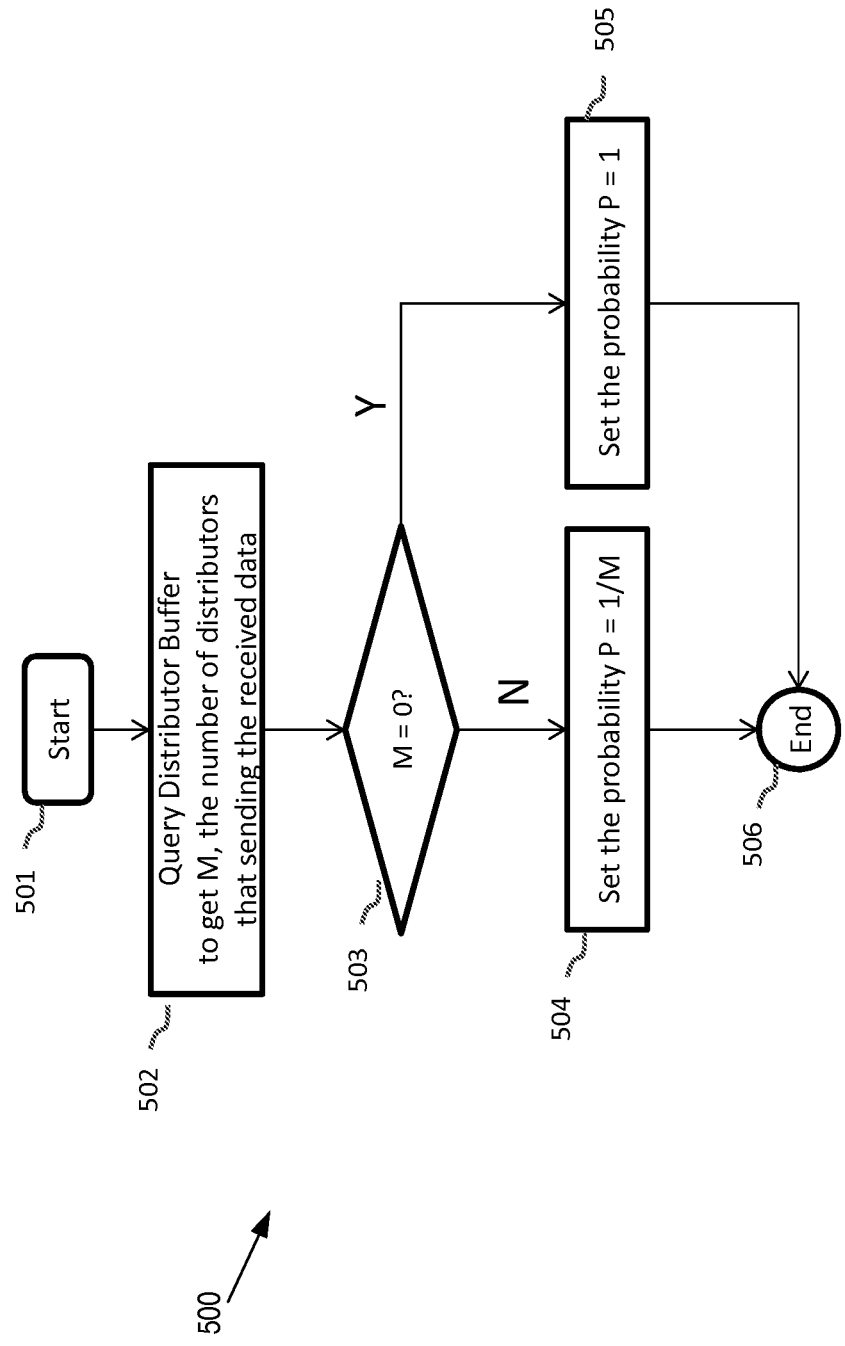
FIG. 5 illustrates an example flowchart of an example operation of calculating the probability to become a relaying distributor, in accordance with an example embodiment of the invention.

FIG. 5 illustrates an example flowchart of an example operation of calculating the probability to become a relaying distributor, in accordance with an example embodiment of the invention. An exemplary implementation for calculating relay probability 409 is that, a collector set the probability of becoming a relaying distributor as being the reverse of the number of the perceived distributors of the received data. As shown in FIG. 5, after the start point 501, the collector device queries the Distributor Buffer to get M, the number of distributors that sending the received data 502. It then judges the value of M 503, if M>0, then the probability P=1/M 504, elsewise if M equals to 0, the probability P=1 505.

The random delay after receiving completion 408 is particularly important since it makes the relaying decision out of sync, so that some of the nodes can observe other relaying distributors before they calculating the relaying probability, and in this way, to reduce the overlay redundancy. E.g., given a case where 1 seminal distributor is dispatching data to nearby 50 nodes, when all 50 nodes have completed receiving, according to the algorithm described in FIG. 5, they all synchronously become the relay node with probability of 1 without the random delay period. In contrast, when applied the random delay, it is only the node with the shortest delay that has the probability of 1 becoming the relaying distributor; the node with second shortest delay, if observe the seminal distributor and the first relaying distributor, has the probability of ½ becoming the relaying distributor; the third node, consequently, has the probability of ⅓ (if the second became a relaying distributor) or ½ (if the second did not become a relaying distributor) . . . .

In an example embodiment of the invention, the ADV_DATA_MULTICAST_PDU may also support steaming traffic. For example, if the Data Len field content is 0, then the data being distributed may be considered as streaming traffic.

FIG. 6 illustrates an example embodiment of the invention, wherein examples of removable storage media are shown, based on magnetic, electronic and/or optical technologies, such as magnetic disks, optical disks, semiconductor memory circuit devices and micro-SD memory cards (SD refers to the Secure Digital standard) for storing data and/or computer program code as an example computer program product, in accordance with at least one embodiment of the present invention.

Using the description provided herein, the embodiments may be implemented as a machine, process, or article of manufacture by using standard programming and/or engineering techniques to produce programming software, firmware, hardware or any combination thereof.

Any resulting program(s), having computer-readable program code, may be embodied on one or more computer-usable media such as resident memory devices, smart cards or other removable memory devices, or transmitting devices, thereby making a computer program product or article of manufacture according to the embodiments. As such, the terms "article of manufacture" and "computer program product" as used herein are intended to encompass a computer program that exists permanently or temporarily on any computer-usable medium or in any transmitting medium which transmits such a program.

As indicated above, memory/storage devices include, but are not limited to, disks, optical disks, removable memory devices such as smart cards, SIMs, WIMs, semiconductor memories such as RAM, ROM, PROMS, etc. Transmitting mediums include, but are not limited to, transmissions via wireless communication networks, the Internet, intranets, telephone/modem-based network communication, hard-wired/cabled communication network, satellite communication, and other stationary or mobile network systems/communication links.

Although specific example embodiments have been disclosed, a person skilled in the art will understand that changes can be made to the specific example embodiments without departing from the spirit and scope of the invention.

What is claimed is:

1. A method, comprising:
   creating, at an apparatus, operating parameters for a two-way Bluetooth Low Energy (BLE) wireless data channel connection and descriptive information regarding content available on the two-way BLE wireless data channel connection;
   transmitting, by the apparatus, one or more BLE non-connectable undirected wireless advertising channel messages indicating presence of the two-way BLE wireless data channel connection, the operating parameters associated with the two-way BLE wireless data channel connection, and the descriptive information regarding the content available on the two-way BLE wireless data channel connection; and
   transmitting, by the apparatus, information on the two-way BLE wireless data channel connection according to the operating parameters, including the content.

2. The method of claim 1, wherein the wireless advertising channel message includes an indication of what portion of a full complement of the content the apparatus has available for downloading.

3. The method of claim 1, further comprising:
   receiving the content available, from one or more distributor devices on one or more two-way BLE wireless data channel connections.

4. The method of claim 1, wherein the wireless advertising channel message is transmitted on a Bluetooth Low Energy advertising channel and the wireless data channel is a Bluetooth Low Energy data channel.

5. The method of claim 1, wherein the operating parameters included in the wireless advertising channel messages enable a receiving device to receive the information transmitted on the two-way BLE wireless data channel connection.

6. A method, comprising:
   receiving, by an apparatus, one or more Bluetooth Low Energy (BLE) non-connectable undirected wireless advertising channel messages that include descriptive information regarding content available on one or more two-way BLE wireless data channel connections;
   compiling a list of one or more distributor devices advertising content available on the one or more two-way BLE wireless data channel connections, based on the received wireless advertising channel messages, the list including the description of the content available; and
   selecting from the list, one of the one or more distributor devices, based on the description in the wireless advertising channel messages, of the content available.

7. The method of claim 6, wherein the selecting is based on a portion of the content being indicated as available as indicated in the wireless advertising channel messages and whether less than all of the content has been previously accumulated by the apparatus.

8. The method of claim 6, further comprising:
   receiving one or more copies of the content from the one or more two-way BLE wireless data channel connections;
   filtering the one or more copies of the received content based on the description of the available content in the wireless advertising channel messages; and
   presenting only one copy of the content.

9. The method of claim 6, further comprising:
   computing an auto-relaying probability that the apparatus may become a distributor device to further advertise and distribute the content, based on receiving one or more non-connectable undirected wireless advertising channel messages from one or more other distributor devices.

10. The method of claim 6, wherein the wireless advertising channel message is received on a Bluetooth Low Energy advertising channel and the wireless data channel is a Bluetooth Low Energy data channel.

11. An apparatus, comprising:
    at least one processor;
    at least one memory including computer program code;
    the at least one memory and the computer program code configured to, with the at least one processor, cause the apparatus at least to:
    create operating parameters for a two-way Bluetooth Low Energy (BLE) wireless data channel connection and descriptive information regarding content available on the two-way BLE wireless data channel connection;
    transmit one or more BLE non-connectable undirected wireless advertising channel messages indicating presence of the two-way BLE wireless data channel connection, the operating parameters associated with the two-way BLE wireless data channel connection, and the descriptive information regarding the content available on the two-way BLE wireless data channel connection; and
    transmit information on the two-way BLE wireless data channel connection according to the operating parameters, including the content.

12. The apparatus of claim 11, wherein the wireless advertising channel message includes an indication of what portion of a full complement of the content the apparatus has available for downloading.

13. The apparatus of claim 11,
    the at least one memory and the computer program code configured to, with the at least one processor, cause the apparatus at least to:
    receive the content available, from one or more distributor devices on one or more two-way BLE wireless data channel connections.

14. The apparatus of claim 11, wherein the wireless advertising channel message is transmitted on a Bluetooth Low Energy advertising channel and the wireless data channel is a Bluetooth Low Energy data channel.

15. The apparatus of claim 11, wherein the operating parameters included in the wireless advertising channel messages enable a receiving device to receive the information transmitted on the two-way BLE wireless data channel connection.

16. An apparatus, comprising:
at least one processor;
at least one memory including computer program code;
the at least one memory and the computer program code configured to, with the at least one processor, cause the apparatus at least to:
receive one or more Bluetooth Low Energy (BLE) non-connectable undirected wireless advertising channel messages that include descriptive information regarding content available on one or more two-way BLE wireless data channel connections;
compile a list of one or more distributor devices advertising content available on the one or more two-way BLE wireless data channel connections, based on the received wireless advertising channel messages, the list including the description of the content available; and
select from the list, one of the one or more distributor devices, based on the description in the wireless advertising channel messages, of the content available.

17. The apparatus of claim 16, wherein the selecting is based on a portion of the content being indicated as available as indicated in the wireless advertising channel messages and whether less than all of the content has been previously accumulated by the apparatus.

18. The apparatus of claim 16, further comprising:
the at least one memory and the computer program code configured to, with the at least one processor, cause the apparatus at least to:
receive one or more copies of the content from the one or more two-way BLE wireless data channel connections;
filter the one or more copies of the received content based on the description of the available content in the wireless advertising channel messages; and
present only one copy of the content.

19. The apparatus of claim 16, further comprising:
the at least one memory and the computer program code configured to, with the at least one processor, cause the apparatus at least to:
compute an auto-relaying probability that the apparatus may become a distributor device to further advertise and distribute the content, based on receiving one or more non-connectable undirected wireless advertising channel messages from one or more other distributor devices.

20. The apparatus of claim 16, wherein the wireless advertising channel message is received on a Bluetooth Low Energy advertising channel and the wireless data channel is a Bluetooth Low Energy data channel.

21. A computer program product comprising computer executable program code recorded on a computer readable non-transitory storage medium, the computer executable program code comprising:
code for creating, at an apparatus, operating parameters for a two-way Bluetooth Low Energy (BLE) wireless data channel connection and descriptive information regarding content available on the two-way BLE wireless data channel connection;
code for transmitting, by the apparatus, one or more BLE non-connectable undirected wireless advertising channel messages indicating presence of the two-way BLE wireless data channel connection, the operating parameters associated with the two-way BLE wireless data channel connection, and the descriptive information regarding the content available on the two-way BLE wireless data channel connection; and
code for transmitting, by the apparatus, information on the two-way BLE wireless data channel connection according to the operating parameters, including the content.

22. A computer program product comprising computer executable program code recorded on a computer readable non-transitory storage medium, the computer executable program code comprising:
code for receiving, by an apparatus, one or more Bluetooth Low Energy (BLE) non-connectable undirected wireless advertising channel messages that include descriptive information regarding content available on one or more two-way BLE wireless data channel connections;
code for compiling a list of one or more distributor devices advertising content available on the one or more two-way BLE wireless data channel connections, based on the received wireless advertising channel messages, the list including the description of the content available; and
code for selecting from the list, one of the one or more distributor devices, based on the description in the wireless advertising channel messages, of the content available.

* * * * *